Patented June 30, 1953

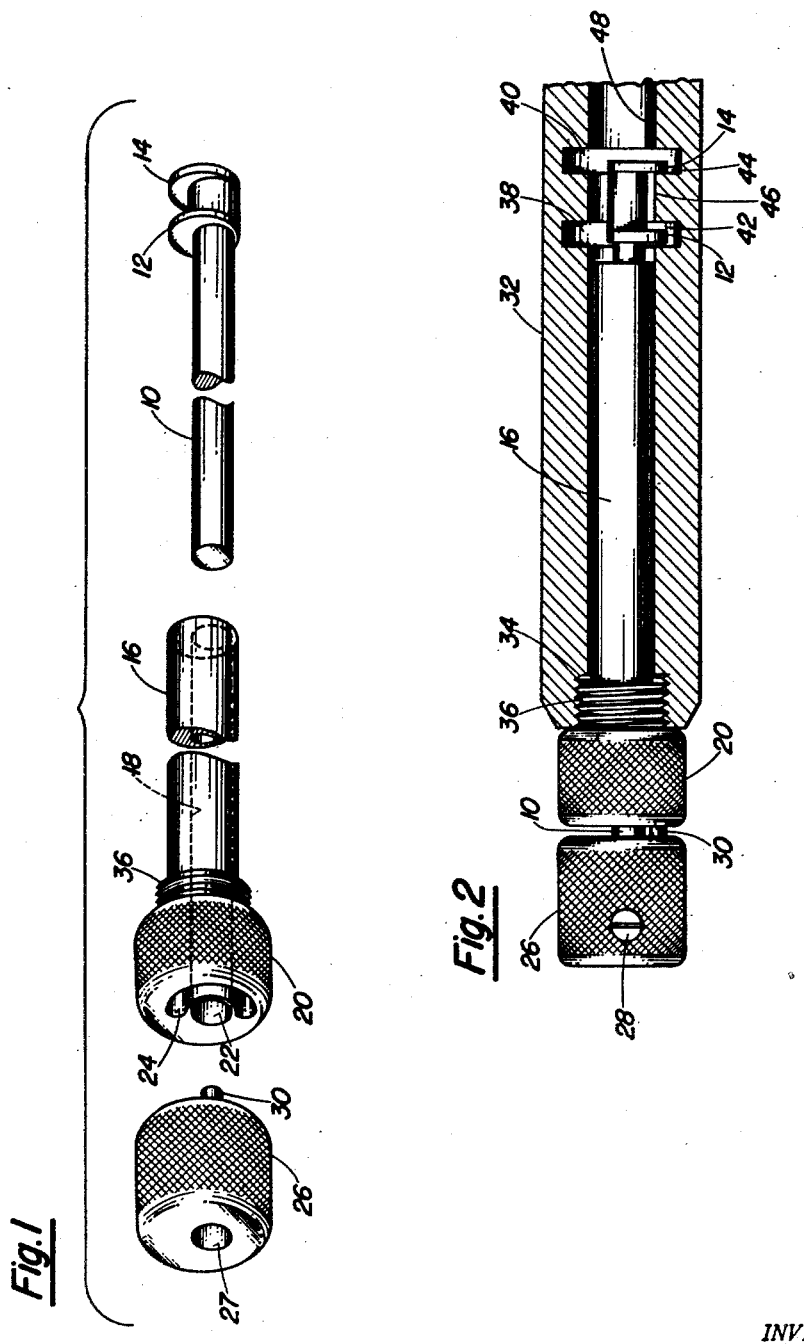

2,643,459

UNITED STATES PATENT OFFICE 2,643,459

MEASURING DEVICE FOR PISTONS IN DEPTH ENGINES

Bobbie E. Beers, Sweet Home, Oreg. and Selmer G. Snortland, Valier, Mont.

Application March 1, 1950, Serial No. 147,112

5 Claims. (Cl. 33—143)

(Granted under Title 35, U. S. Code (1952), sec. 266)

The invention relates to gages and particularly to gages for indicating the rectilinear distance between adjacent points on spaced discontinuities such as grooves formed in or projections extending from the inner surfaces of hollow bodies.

Modern machinery often includes hollow members that are formed with discontinuities spaced along the cavity surface thereof. The rectilinear distance between adjacent points on these spaced discontinuities frequently is critical and must be accurately measured so that defective machinery will not be approved for use. The art heretofore has not provided means for accurately indicating this critical rectilinear distance between adjacent points on spaced discontinuities. Internal gages are well known, but no internal gage has heretofore been capable of accurately measuring internal rectilinear distances.

It is therefore a prime object of the invention to provide means for measuring the rectilinear distance between adjacent points on spaced discontinuities formed as defined herein.

Although the invention herein is usable to indicate the rectilinear distance between adjacent points on spaced discontinuities formed in any hollow body, so long as the gage can be positioned within the cavity for successively contacting the adjacent points, for the purpose of illustrating the invention the gage has been shown seated within a hollow cylinder having axially spaced grooves formed in the inner surface thereof.

Briefly, the invention comprises means for displacing parallel to the axis of the cylinder a pair of spaced contacts for successively contacting the adjacent walls of the spaced grooves, the axial distance between the adjacent walls being the rectilinear distance which is to be measured. Broadly, the invention is directed to a gage that can be mounted in the cavity of the hollow cylinder so that the contacts can be reciprocated along an axis that is parallel to the axis of the cavity for successively contacting adjacent walls. Specifically, the invention includes the further feature of an angular displacement, or rotation, of the contacts about an eccentric axis of reciprocation between hereinbelow defined inoperative and operative positions, so that the gage can be inserted into and used in cylinders whose internal diameters are only slightly greater than the outside diameter of the gage.

In a presently preferred embodiment of the invention the gage includes a shaft having a pair of axially spaced contacts. Means are provided for mounting the shaft within the internally grooved cylinder for rotation about and reciprocation along an axis parallel to the axis of the cylinder. This mounting means comprises a cylindrical bearing member adapted to be so fixed within the cylinder that their respective axes are parallel. Any convenient means can be employed for so fixing or anchoring the bearing member within the cavity of the cylinder. The bearing member is provided with an eccentric bore for receiving the said shaft for rotation and reciprocation therein. The length of the bearing member relative to the shaft is not significant, except that it should be sufficiently long so that the shaft will be carried therein for displacement only along and about the axis of the core, and will be constrained against tilting or cocking relative thereto. The shaft is reciprocably carried within the bearing member so that the contacts can successively engage adjacent walls of the spaced grooves in the cylinder. The shaft is rotatably carried so that the contacts can first be moved into a position where they will not engage the cylinder while the gage is being inserted therein, this position being termed the inoperative position of the shaft and contacts, and the contacts can then be moved to project into the grooves formed in the inner surface of the cylinder when the gage is fully inserted into the cylinder, this position being termed the operative position of the shaft and contacts. Means such as a pin carried by the shaft and positioned to ride in a semi-circular slot formed in the bearing member is provided for limiting the rotation of the shaft within the bore to an angular displacement from one of the two positions to the other.

For a better understanding of the invention, reference is made to the following specification of a preferred embodiment of the invention, said specification to be read in connection with the attached drawing wherein, Fig. 1 is an exploded view of a gage embodying the invention, and Fig. 2 is a view, partly in section, of the gage in assembled relation and shown fixed in a grooved cylinder.

Reference is now made to the drawings, wherein there is shown a shaft 10 carrying a pair of spaced contacts 12 and 14. A cylindrical bearing member 16 is provided having an eccentric bore 18. Bearing member 16 is further provided on one end thereof with a knob 20 having a bore 22 continuous with bore 18 and having a semicircular slot 24 concentric with bore 22. The shaft 10 is received within bores 18 and 22 for rotation and reciprocation therein, and is provided with a knob 26 having a similarly eccentrically disposed bore 27 for receiving the shaft, the knob 26 being fixed thereto by a set screw 28. Knob 26 is also provided with a pin 30 projecting therefrom and positioned to ride in slot 24.

In Fig. 2 the gage is shown fixed or anchored within the cavity of a grooved cylinder 32. Since this particular cylinder is provided with an enlarged, threaded portion 34, the bearing member 16 is correspondingly provided with an enlarged, threaded portion 36 for mating engagement therewith. It will be apparent that the use of mating threads is a matter of choice, and that any convenient means such as wedges, radially adjustable set screws, tapered plugs or the like can be employed for fixing the gage within a cylinder, the only requirement being that the gage be so mounted therein that the shaft 10 can be displaced along and about an axis that is parallel to the axis of the cylinder, and can be held against cocking relative thereto.

The hollow cylinder 32, which of course is merely illustrative of one of many types of hollow bodies that can be measured by the gage disclosed herein, includes a pair of circumferential grooves 38 and 40 forming a pair of adjacent walls 42 and 44, the axial distance 46 therebetween along the inner surface 48 of the cylinder being the distance that it is desired to measure. The internal diameter of the cylinder has been chosen to be approximately equal to the transverse dimension of the gage in order to illustrate the advantage of mounting the shaft for rotation as well as reciprocation.

As pointed out above, the gage is inserted into the cylinder and is fixed therein by the engagement of threaded portions 34 and 36. It will be apparent that if the shaft 10 carrying the contacts 12 and 14 were fixed in the gage in the position illustrated in Fig. 2, the gage could not be inserted into the cylinder cavity, since the distance from the upper surface of the bearing member 16 to the lower-most point of the contacts 12 and 14 is greater than the internal diameter of the cylinder or, expressed otherwise, since the contacts extend radially past the outer cylindrical surface of the bearing member. The reason for mounting the shaft 10 eccentrically and rotatably within the bearing member 16 will now be seen, since by this means the shaft 10 can be rotated through approximately 180° from the position illustrated in Fig. 2 to thereby move the contacts to a position where they cannot engage the cylinder so that the gage can be inserted into the cylinder cavity.

In the embodiment of the invention illustrated the contacts 12 and 14 comprise a pair of discs positioned eccentrically on the shaft 10 and of a diameter approximately equal to the diameter of the bearing member. When the shaft 10 is thus rotated through 180°, the contact discs are moved into a position where the discs are substantially concentric with the bearing member 16. The shape of the contacts 12 and 14 is a matter of choice, of course, the essential requirement being that the contacts must be of such a size and shape that they can be moved into a position where they will lie within the end shadow of the bearing member, so that only the diameter of the bearing member will determine the lower limit on the size of the cylinder wherein the gage can be received.

*Operation*

Once the gage has been inserted into the cylinder cavity, the shaft 10 is rotated back through 180° to move the contacts out of concentricity with the bearing and into the grooves so that when reciprocated they can successively contact the walls thereof. For convenience, these two angular positions have herein been defined respectively as the inoperative and the operative positions of the shaft and contacts. The pin 30 riding in the slot 34 serves to limit the angular displacement of shaft 10 within bearing member 16 so that the shaft can be accurately moved between the two positions.

After the gage has been fixed within the cylinder and the shaft has been rotated to move the contacts from the inoperative position into the operative position, the shaft 10 is moved inwardly until the contact 12 touches the wall 42. While the shaft 10 is in this position, the displaceable element of a dial indicator (not shown) or the like is placed against the knob 26. The shaft is then moved outwardly until the contact 14 touches the wall 44. The dial indicator is actuated by the movement of the shaft 10 and can be calibrated to read the axial distance 46 directly.

Obviously many modifications and variations of the present invention are possible in the light of the above teachings. For example, by increasing the axial spacing between the contacts, the axial distance between the remote walls, rather than the axial distance between the near or adjacent walls, could be measured. It is therefore to be understood that within the scope of the appended claims the invention can be practiced otherwise than as specifically described.

The invention described herein may be manufactured and used by or for the Government of the United States of America for governmental purposes without the payment of any royalties thereon or therefor.

What is claimed is:

1. A gage for indicating the rectilinear distance between adjacent walls of spaced grooves formed in the inner surface of a hollow body comprising a cylindrical bearing member having an eccentric bore formed therethrough, a shaft received within said bore for rotation and reciprocation therein, and a pair of spaced contacts carried by said shaft.

2. The gage according to claim 1 including means for so fixing said bearing member within said cavity that said shaft can be rotated about and reciprocated along an axis parallel to said rectilinear distance.

3. A gage for indicating the axial distance between adjacent walls of spaced grooves formed in the internal surface of a hollow cylinder comprising a cylindrical bearing member having an eccentric bore formed therethrough, a shaft received within said bore for rotation and reciprocation therein, a pair of spaced contacts carried by said shaft, and means for so fixing said bearing member within said hollow cylinder that said shaft can be rotated about and reciprocated along an axis parallel to the axis of the cylinder.

4. A gage for use within a cylinder comprising a longitudinally extended bearing member adapted to be fixed coaxially within said cylinder, a bore extending through said bearing member, the axis of said bore being parallel to and spaced from the axis of said bearing member, a shaft received within said bore for rotation and reciprocation therein, and a pair of axially spaced contacts carried by said shaft.

5. The device according to claim 4 including cooperating means carried by said bearing member and said shaft for limiting the rotational displacement of said shaft from an inoperative position to an operative position.

BOBBIE E. BEERS.
SELMER G. SNORTLAND.

References Cited in the file of this patent

UNITED STATES PATENTS

| Number | Name | Date |
|---|---|---|
| 455,644 | Sloane | July 7, 1891 |
| 1,110,879 | Brown | Sept. 15, 1914 |
| 2,563,440 | Wilson et al. | Aug. 7, 1951 |

FOREIGN PATENTS

| Number | Country | Date |
|---|---|---|
| 738,779 | France | Oct. 18, 1932 |